(12) United States Patent
Chae et al.

(10) Patent No.: US 10,546,436 B2
(45) Date of Patent: Jan. 28, 2020

(54) VEHICLE TEST SYSTEM HAVING A GATEWAY FOR DETERMINING WHETHER AN ELECTRONIC DEVICE IS TESTABLE, VEHICLE AND VEHICLE TEST METHOD

(71) Applicants: HYUNDAI MOTOR COMPANY, Seoul (KR); KIA MOTORS CORPORATION, Seoul (KR)

(72) Inventors: Junbyung Chae, Seoul (KR); Byeonggeon Jeon, Pohang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 151 days.

(21) Appl. No.: 15/799,696

(22) Filed: Oct. 31, 2017

(65) Prior Publication Data

US 2018/0374282 A1 Dec. 27, 2018

(30) Foreign Application Priority Data

Jun. 23, 2017 (KR) .................. 10-2017-0079568

(51) Int. Cl.
| G07C 5/00 | (2006.01) |
| G07C 5/08 | (2006.01) |
| H04L 12/66 | (2006.01) |
| H04L 12/26 | (2006.01) |
| H04L 29/08 | (2006.01) |

(52) U.S. Cl.
CPC ........... *G07C 5/008* (2013.01); *G07C 5/0816* (2013.01); *H04L 12/66* (2013.01); *H04L 43/50* (2013.01); *G07C 5/00* (2013.01); *G07C 2205/02* (2013.01); *H04L 43/0817* (2013.01); *H04L 67/12* (2013.01)

(58) Field of Classification Search
CPC .. G07C 5/008; G07C 5/0816; G07C 2205/02; H04L 12/66; H04L 67/12
See application file for complete search history.

(56) References Cited

U.S. PATENT DOCUMENTS

| 5,491,631 A * | 2/1996 | Shirane ................... F02D 41/22 |
| | | 123/479 |
| 6,421,790 B1 * | 7/2002 | Fruehling ........... G06F 11/1004 |
| | | 714/30 |
| 6,526,340 B1 * | 2/2003 | Reul .................... G05B 23/027 |
| | | 340/439 |

(Continued)

FOREIGN PATENT DOCUMENTS

| JP | 5054734 B2 | 10/2012 |
| JP | 2013131907 A | 7/2013 |

(Continued)

*Primary Examiner* — Ramsey Refai
(74) *Attorney, Agent, or Firm* — Morgan, Lewis & Bockius LLP

(57) ABSTRACT

A vehicle test system includes a vehicle including at least one electronic device and a gateway configured to determine whether the electronic device is testable, a test device configured to test the electronic device, in which the electronic device includes a controller for controlling an operation of the electronic device, and the gateway is configured to determine whether or not the electronic device is testable in a different manner depending on whether the electronic device includes a separate communication device and transmits a determined result to the test device.

22 Claims, 8 Drawing Sheets

(56) References Cited

U.S. PATENT DOCUMENTS

| | | | | |
|---|---|---|---|---|
| 8,472,942 | B2* | 6/2013 | Ying | H04L 43/50 |
| | | | | 455/41.2 |
| 10,037,633 | B2* | 7/2018 | Gintz | G06F 8/65 |
| 2007/0100520 | A1* | 5/2007 | Shah | G07C 5/008 |
| | | | | 701/31.4 |
| 2008/0266051 | A1* | 10/2008 | Taki | B60R 25/2009 |
| | | | | 340/5.1 |
| 2011/0225410 | A1* | 9/2011 | Hung | G06F 11/0757 |
| | | | | 713/2 |
| 2012/0046824 | A1* | 2/2012 | Ruther | B60R 16/0315 |
| | | | | 701/31.5 |
| 2014/0180532 | A1* | 6/2014 | Ubik | G07C 5/008 |
| | | | | 701/33.2 |
| 2014/0380416 | A1 | 12/2014 | Adachi | |
| 2015/0254909 | A1* | 9/2015 | Harata | H04L 12/4625 |
| | | | | 701/31.5 |
| 2017/0134503 | A1* | 5/2017 | Cho | H04L 67/16 |
| 2017/0352201 | A1* | 12/2017 | Kumabe | G07C 5/008 |
| 2019/0089100 | A1* | 3/2019 | Kim | H01R 13/6683 |

FOREIGN PATENT DOCUMENTS

| | | | |
|---|---|---|---|
| KR | 10-1095583 | B1 | 12/2011 |
| KR | 10-1580568 | B1 | 12/2015 |
| KR | 10-1601751 | B1 | 3/2016 |

\* cited by examiner

VEHICLE TEST SYSTEM HAVING A GATEWAY FOR DETERMINING WHETHER AN ELECTRONIC DEVICE IS TESTABLE, VEHICLE AND VEHICLE TEST METHOD

CROSS-REFERENCE TO RELATED APPLICATION(S)

This application is based on and claims the benefit of priority to Korean Patent Application No. 10-2017-0079568, filed on Jun. 23, 2017 with the Korean Intellectual Property Office, the entire disclosure of which is incorporated herein.

TECHNICAL FIELD

The present disclosure relates to a method of testing an electronic device installed in a vehicle, and more particularly, relates to a method for determining whether an electronic device is testable differently depending on whether or not the electronic device includes a separate microcontroller unit (MCU).

BACKGROUND

In modern society, vehicles are the most common transportation means, and the number of people driving vehicles keeps increasing. Development of automotive technology is changing many things in our lives, e.g., making it easy to travel long distances and making our lives more convenient. Many electronic devices for vehicles such as hands-free systems, GPS receivers, Bluetooth devices, and terminals allowing easy pass through tollgates (e.g., easy-pass terminals in the US and high-pass terminals in Korea) are being developed for the convenience of drivers. Moreover, vehicles are typically equipped with a communication device for communicating with a user equipment (UE) and a charging device for charging the UE.

However, in recent years, many electronic devices are installed in a vehicle and often operate at the same time. However, in such a case, one of the many electronic devices may not operate properly. It is therefore required to periodically test whether the electronic devices operate properly by using an external test device.

When testing the electronic devices installed in the vehicle by using the external test device, a user turns on the vehicle and connects the external test device to the vehicle to start the test. When each of the electronic devices receives a signal transmitted from the external test device and transmits a response signal based on the signal to the external test device, the external test device receives the signal transmitted by the electronic devices. The external test device determines whether the electronic devices are operating properly based on the received signal.

Therefore, after the start-up of the vehicle, if the external test device sends a signal to the electronic devices before the electronic devices become ready to receive the signal, the electronic devices may not receive the signal normally and may not proceed with the test.

However, according to the related art, there is a disadvantage in that the user may not be able to distinguish whether the electronic devices may or may not start the test because the electronic devices have not yet reached a normal state after booting, or the electronic devices are simply not operating properly and is not testable.

Therefore, the present disclosure is to solve the problems of the prior art as described above, to provide a technique for determining more quickly and accurately whether an electronic device is testable by using an MCU device included in the electronic devices.

SUMMARY

According to an embodiment of the present disclosure, a vehicle test system comprises a vehicle comprising at least one electronic device and comprising a gateway configured to determine whether or not the electronic device is testable, a test device configured to test the electronic device and wherein the electronic device comprises a controller for controlling an operation of the electronic device and wherein the gateway configured to determine whether or not the electronic device is testable in a different manner depending on whether the electronic device comprises a separate communication device and transmits a determined result to the test device.

The gateway may determine whether or not the electronic device is testable based on a state of the controller received from the communication device when the electronic device comprises the communication device.

The gateway is configured to determine that the electronic device is not testable when the controller is not operating normally and transmits an NRC (Negative Response Code) to the test device.

The communication device may include a microcontroller unit (MCU) capable of communicating with the gateway and controller and the controller may include a central processing unit (CPU).

The gateway may determine that the electronic device is not testable and transmits the NRC to the test device if the CPU is turned off or before booting is completed.

The gateway may determine whether or not the electronic device is testable based on an elapsed time after the controller of the electronic device is turned on when the electronic device does not comprise the communication device and the gateway is unable to communicate with the controller.

The gateway is configured to transmit the NRC to the test device when a predetermined time has not elapsed after the controller of the electronic device is turned on.

The gateway may transmit a code indicating that testing of the electronic device is impossible to the test device when the predetermined time has not elapsed after the controller of the electronic device is turned on.

According to another embodiment of the present disclosure a vehicle comprise at least one electronic device, a gateway configured to communicate with an external device testing the electronic device and determine whether the electronic device is testable and wherein the electronic device comprises a controller for controlling an operation of the electronic device and wherein the gateway configured to determine whether or not the electronic device is testable in a different manner depending on whether the electronic device comprises a separate communication device and transmits a determined result to the test device.

The gateway may determine whether or not the electronic device is testable based on a state of the controller received from the communication device when the electronic device comprises the communication device.

The gateway may determine that the electronic device is not testable when the controller is not operating normally and transmits an NRC to the test device.

The communication device may include an MCU capable of communicating with the gateway and controller and wherein the controller comprises a CPU.

The gateway may determine that the electronic device is not testable and transmits an NRC to the test device when the CPU is turned off or before booting is completed.

The gateway may determine whether or not the electronic device is testable based on an elapsed time after the controller of the electronic device is turned on when the electronic device does not comprise the communication device and the gateway is unable to communicate with the controller.

The gateway may transmit an NRC to the test device when a predetermined time has not elapsed after the controller of the electronic device is turned on.

The gateway may transmit a code indicating that testing of the electronic device is impossible to the test device when a predetermined time has not elapsed after the controller of the electronic device is turned on.

According to another embodiment of the present disclosure a method for controlling a vehicle comprising at least one electronic device, the method comprise determining whether the electronic device is testable and transmitting a determined result to an external device for testing the electronic device and wherein the determining whether the electronic device is testable comprises determining whether the electronic device is testable in a different manner according to whether the electronic device comprises an MCU capable of determining a state of a CPU of the electronic device.

The determining whether the electronic device is testable may comprise determining whether or not the electronic device is testable based on the state of the CPU received from the MCU when the electronic device comprises the CPU.

The determining whether the electronic device is testable may comprise determining that the electronic device is not testable and transmitting an NRC to the external device when the CPU is turned off or before booting is completed.

The determining whether the electronic device is testable may comprises determining whether or not the electronic device is testable based on an elapsed time after the CPU of the electronic device is turned on when the electronic device does not comprise the MCU.

The determining whether the electronic device is testable may comprise transmitting an NRC code (Negative Response Code) to the external device when a predetermined time has not elapsed after the CPU of the electronic device is turned on.

The determining whether the electronic device is testable may comprise transmitting a code indicating that testing of the electronic device is impossible to the external device when a predetermined time has not elapsed after the CPU of the electronic device is turned on.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Embodiments and features as described and illustrated in the present disclosure are only preferred examples, and various modifications thereof may also fall within the scope of the disclosure.

The terminology used herein is for the purpose of describing particular embodiments only and is not intended to limit the present disclosure. It is to be understood that the singular forms "a," "an," and "the" include plural references unless the context clearly dictates otherwise.

It will be further understood that the terms "include," "comprise" and/or "have" when used in this specification, specify the presence of stated features, integers, steps, operations, elements, and/or components, but do not preclude the presence or addition of one or more other features, integers, steps, operations, elements, components, and/or groups thereof. It will be understood that, although the terms first, second, third, etc., may be used herein to describe various elements, components, regions, layers and/or sections, these elements, components, regions, layers and/or sections should not be limited by these terms.

Embodiments of the present disclosure will now be described in detail with reference to accompanying drawings to be readily practiced by a person of ordinary skill in the art. It should be noted that what is irrelative to the present disclosure is omitted from the drawings.

Figure 1:
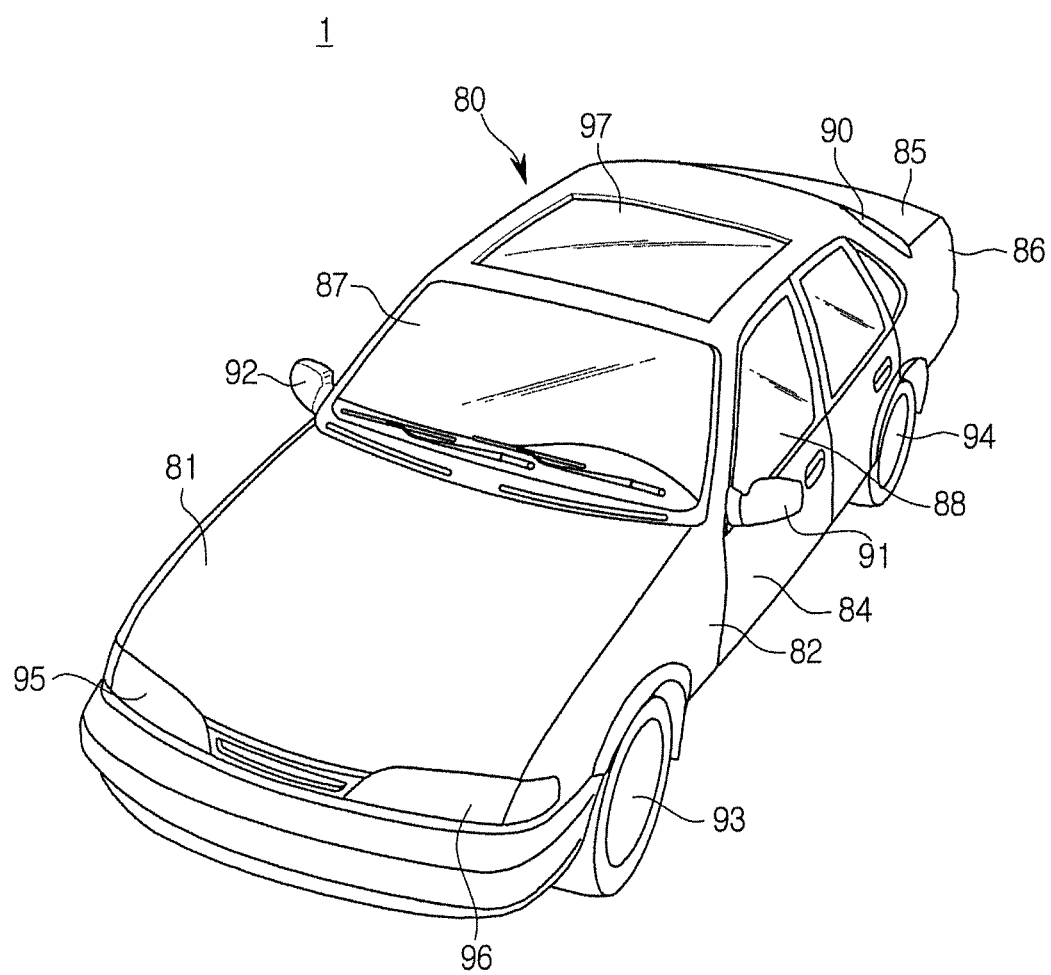
FIG. 1 is an exterior view of a vehicle according to an embodiment of the present disclosure.
Figure 2:
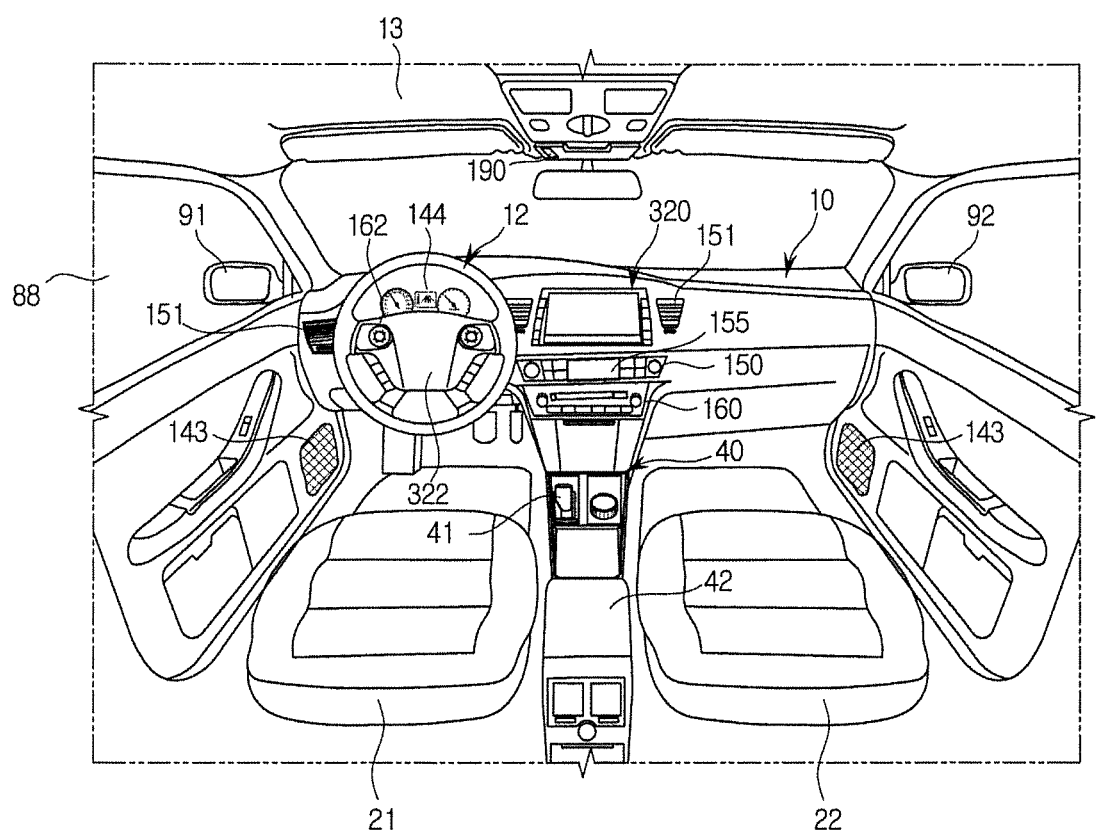
FIG. 2 is an interior view of a vehicle according to an embodiment of the present disclosure.

FIG. 1 is an exterior view of a vehicle, according to an embodiment of the present disclosure, and FIG. 2 is an interior view of a vehicle, according to an embodiment of the present disclosure. The figures will now be described together to avoid overlapping explanation.

Referring to FIG. 1, a vehicle 1 may include a car frame 80 that forms the exterior of the vehicle 1, and wheels 93, 94 for moving the vehicle 1. The car frame 80 may include a hood 81, a front fender 82, doors 84, a trunk lid 85, and a quarter panel 86. The car frame 80 may also include a sunshine roof 97, as shown in FIG. 1. The term 'sunshine roof' 97 may be interchangeably used with a sun roof, which will be used herein for convenience of explanation.

Furthermore, there may be a front window 87 installed on the front of the car frame 80 to allow the driver and passengers to see a view ahead of the vehicle 1, side windows 88 to allow the driver and passengers to see side views, side mirrors 100a, 100b installed on the doors 84 to allow the driver to see areas behind and to the sides of the vehicle 1, and a rear window 90 installed on the rear of the car frame 80 to allow the driver or passengers to see a view behind the vehicle 1.

There may also be head lamps 95, 96 installed on the outer front of the car frame 80 of the vehicle 1 for turning on headlights to secure the view ahead of the vehicle 1.

Furthermore, there may be tail lamps (not shown) installed on the rear of the car frame 80 of the vehicle 1 for turning on taillights to secure the view behind the vehicle 1 or help a driver driving a car behind the vehicle 1 to locate the vehicle 1 as well. The operation of the sun roof 97, head lamps 95, 96, and tail lamps of the vehicle 1 may be controlled according to control commands from the user. The internal features of the vehicle 1 will now be described.

An air conditioner 150 may be equipped in the vehicle 1. The air conditioner 150, as will be described below, refers to a device for controlling air conditioning conditions including indoor/outdoor environmental conditions, air suction/exhaustion state, circulation state, cooling/heating state, etc., of the vehicle 1 automatically or in response to a control command from the user. For example, the vehicle 1 may include the air conditioner 150 to perform heating or cooling and release the heated or cooled air through vents 151 to control the temperature inside the vehicle 1.

There may be a navigation terminal 320 arranged in the vehicle 1. The navigation terminal 320 may refer to a system for providing Global Positioning System (GPS) functions to give the user directions to a destination.

The navigation terminal 320 may also provide an integrated audio and video function. The navigation terminal 320 may generate control signals according to control commands input from the user through various input devices to control devices in the vehicle 1.

For example, the navigation terminal 320 may selectively display at least one of audio, video, and navigation screens through a display, and may also display various control screens related to controlling the vehicle 1.

The display may be located in a center fascia 11, which is the center area of a dashboard 10. In an embodiment, the display may be implemented with Liquid Crystal Displays (LCDs), Light Emitting Diodes (LEDs), Plasma Display Panels (PDPs), Organic Light Emitting Diodes (OLEDs), Cathode Ray Tubes (CRTs), etc., without being limited thereto.

If the display is implemented in a touch screen type, a display may receive various control commands from the user through various touch gestures, such as touching, clicking, dragging, etc.

In the meantime, a center input unit 43 of a jog shuttle type or hard key type may be located in a center console 40. The center console 40 corresponds to a part located between a driver seat 21 and a passenger seat 22, and has a gear-shifting lever 41 and a tray 42.

A cluster 144 may be arranged in the vehicle 1. The cluster 144 may also be called an instrument panel, but for convenience of explanation, the term 'cluster' 144 will be just used in the following description. On the cluster 144, the traveling speed, revolutions per minute (rpm), amount of fuel left of the vehicle 1, etc., are indicated.

Furthermore, there may be a sound input unit 190 arranged in the vehicle 1. For example, the sound input unit 190 may be implemented with a microphone.

To receive a sound input more effectively, the sound input unit 190 may be mounted on a headlining 13, as shown in FIG. 2, or on the dashboard 10 or a steering wheel 12, without being limited thereto.

Moreover, a speaker 143 for outputting sounds may be equipped in the vehicle 1. Accordingly, the vehicle 1 may output sound through the speaker 143 required in performing audio, video, navigation, and other additional functions.

Apart from the aforementioned navigation input unit 102 and the center input unit 43, other various input devices may be arranged inside the vehicle 1 to receive control commands for the aforementioned devices.

Figure 3:
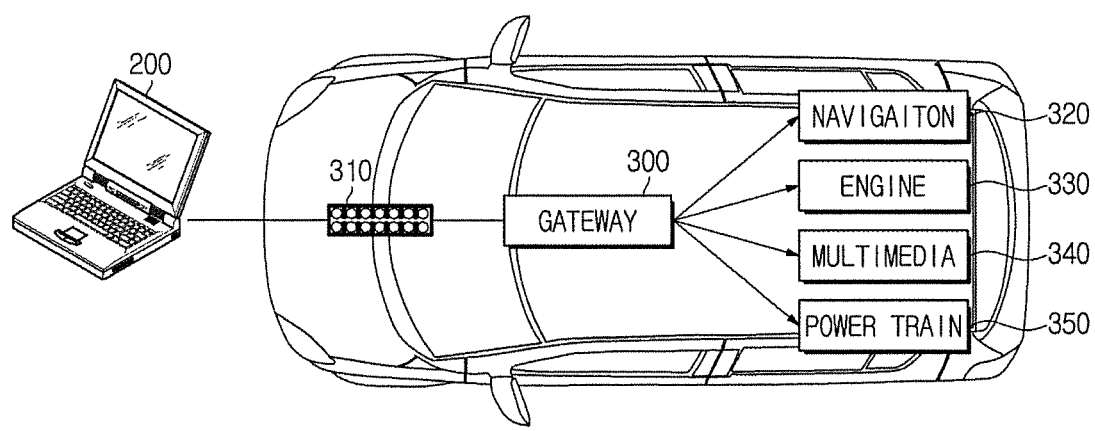
FIG. 3 shows an external device examining a plurality of electronic devices installed in a vehicle according to an embodiment of the present disclosure.

FIG. 3 shows an external device examining a plurality of electronic devices installed in the vehicle 1, according to an embodiment of the present disclosure.

Referring to FIG. 3, the vehicle 1 may include many electronic devices such as a navigation terminal 320, an engine 330, a multimedia 340, a power train 350 and the like and an external device 200 may operate such that the electronic devices operate normally.

The external device 200 transmits a test signal to the electronic devices through a plurality of on-board diagnostics (OBD) terminals 310 and a gateway 300 installed in the vehicle, and the electronic devices transmit a response signal corresponding to the received signal to the gateway 300.

Thereafter, the gateway 300 again transmits a response signal to the external device 200 through the OBD terminals 310 and the external device 200 may check whether the current electronic device is operating normally based on the received signal.

Although the navigation terminal 320, the engine 330, the multimedia 340, and the power train 350 are shown as an example of the electronic device in FIG. 3, the electronic device is not limited thereto. All of the electronic devices installed in the vehicle may be tested by the external device 200.

Figure 4:
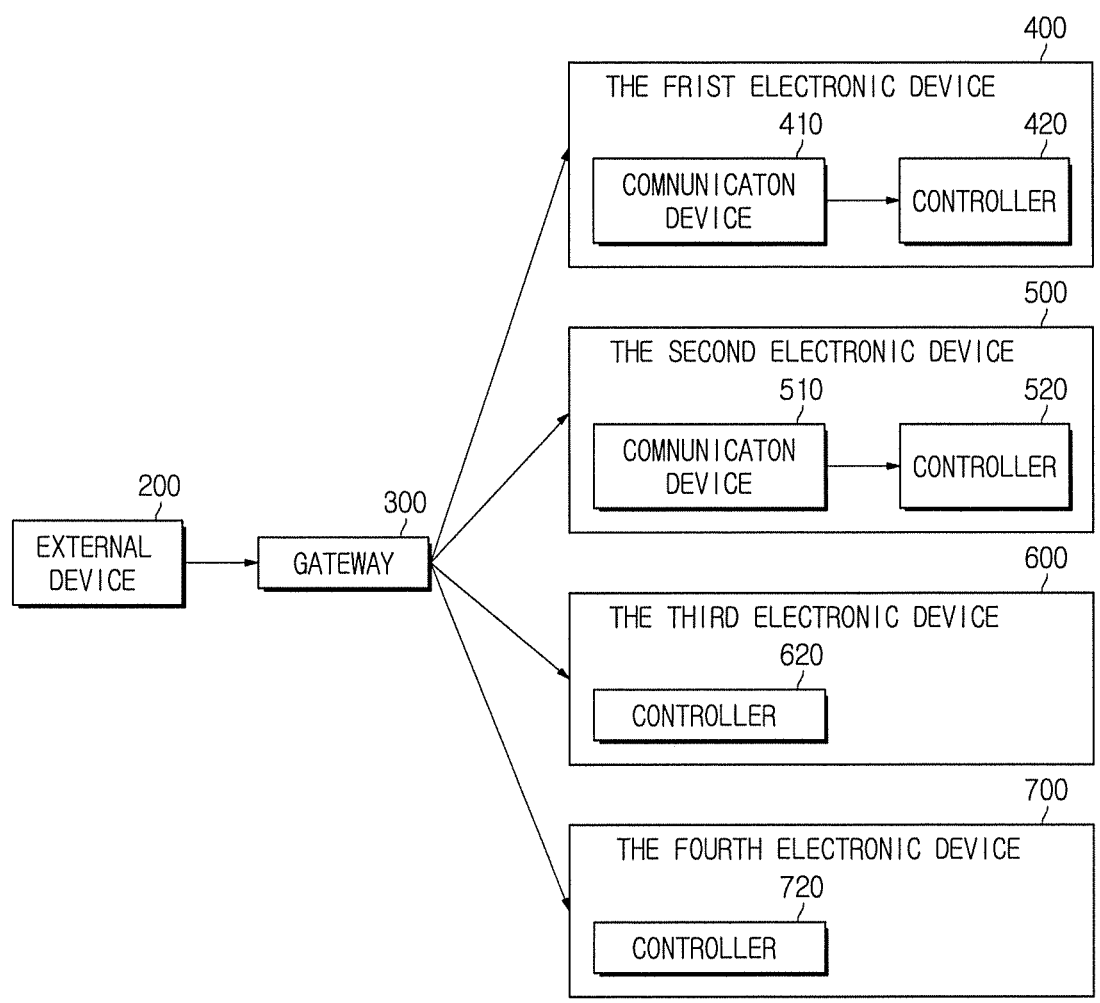
FIG. 4 is a block diagram of a part of a vehicle according to an embodiment of the present disclosure.

FIG. 4 is a block diagram of a part of a vehicle, according to an embodiment of the present disclosure. FIG. 4 to FIG. 7 illustrate a vehicle 1 according to an embodiment of the present disclosure and FIG. 8 illustrates a vehicle test system 100 according to another embodiment.

Turning back to FIG. 3, the vehicle 1 may include a plurality of electronic devices 400, 500, 600, 700 and an external device 200 for performing test of the electronic devices and a gateway 300 in communication with the electronic devices.

The first electronic device 400, the second electronic device 500, the third electronic device 600, and the fourth electronic device 700 shown in FIG. 4 may correspond to any electronic devices that are installed in the vehicle.

The electronic devices installed in the vehicle 1 may include a controller for controlling the electronic devices according to its purpose. The electronic devices may include a communication device capable of determining the current state of the controller and communicating with the outside.

An electronic device such as the first electronic device 400 and the second electronic device 500 shown in FIG. 4 may include controllers 420, 520 and communication devices 410, 510. However, the third electronic device 600 and the fourth electronic device 700 as shown may include only controllers 620, 720 without the communication devices.

Each of the controllers 420, 520, 620, and 720 is an electric circuitry that executes instructions of software which thereby performs various functions described hereinafter.

The communication devices 410, 510 are hardware devices implemented with various electronic circuits to transmit and receive signals via wireless or landline connections.

The communication devices 410, 510 may include a microcontroller unit (MCU) that may complete communication within a short period of time and perform communication, and the controllers 420, 520, 620 and 720 may include a central processing unit (CPU) for controlling the overall operation of the electronic device.

When the electronic device includes the separate communication devices 410, 510, the communication devices 410, 510 may perform communication relatively quickly because the booting time is shorter than that of the controllers 420, 520.

If the electronic device includes only the controllers 620, 720 like the third electronic device 600 and the fourth electronic device 700, the controllers 620, 720 simultaneously perform the roles of the communication devices 410, 510.

The gateway 300 may connect the electronic device installed in the vehicle 1 and the external device 200 testing the electronic device. Specifically, the gateway 300 may receive a test signal transmitted by the external device 200 and transmit the received signal to a plurality of electronic devices.

When the external device 200 tests all of the electronic devices installed in the vehicle 1, the gateway 300 may transmit signals to all of the electronic devices installed in the vehicle 1. However, when the external device 200 tests only a specific electronic device installed in the vehicle 1, the gateway 300 may transmit the signal only to the specific electronic device.

If the electronic device includes the communication devices 410 and 510 like the first electronic device 400 or the second electronic device 500, the communication devices 410 and 510 may transmit a response signal to the gateway 300. However, if the electronic device does not include a communication device such as the third electronic device 600 or the fourth electronic device 700, the controllers 620, 720 may transmit a response signal to the gateway 300.

Thereafter, the gateway 300 transmits a response signal received from the electronic device to the external device 200, and the external device 200 may determine whether the electronic device is in a testable condition based on the received signal. A detailed description thereof will be described later.

The external device 200 may test whether the electronic device installed in the vehicle 1 is operating normally. The external device 200 may perform the same function as a test device 250 in the vehicle test system 100 according to another embodiment.

Figure 5:
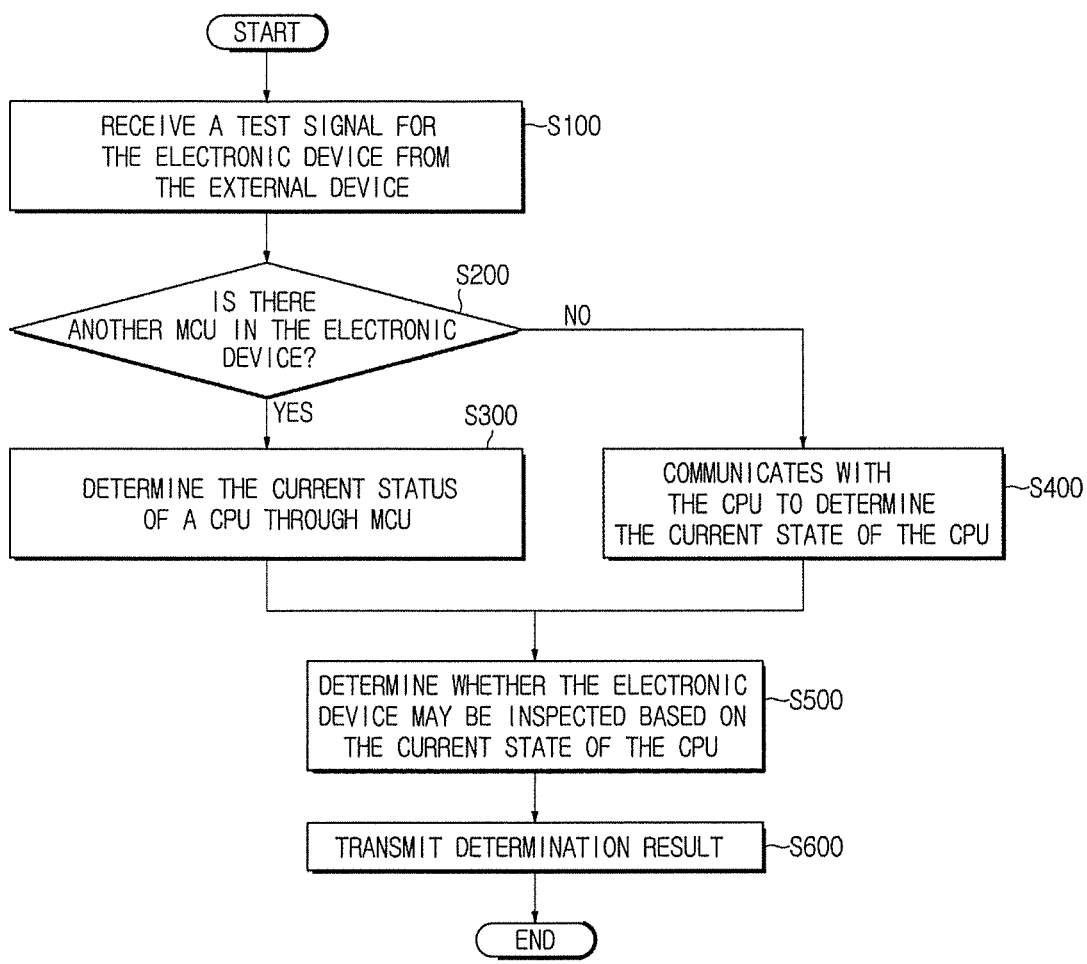
FIG. 5 is a flowchart illustrating a sequence of operation of a vehicle according to an embodiment of the present disclosure.
Figure 6:
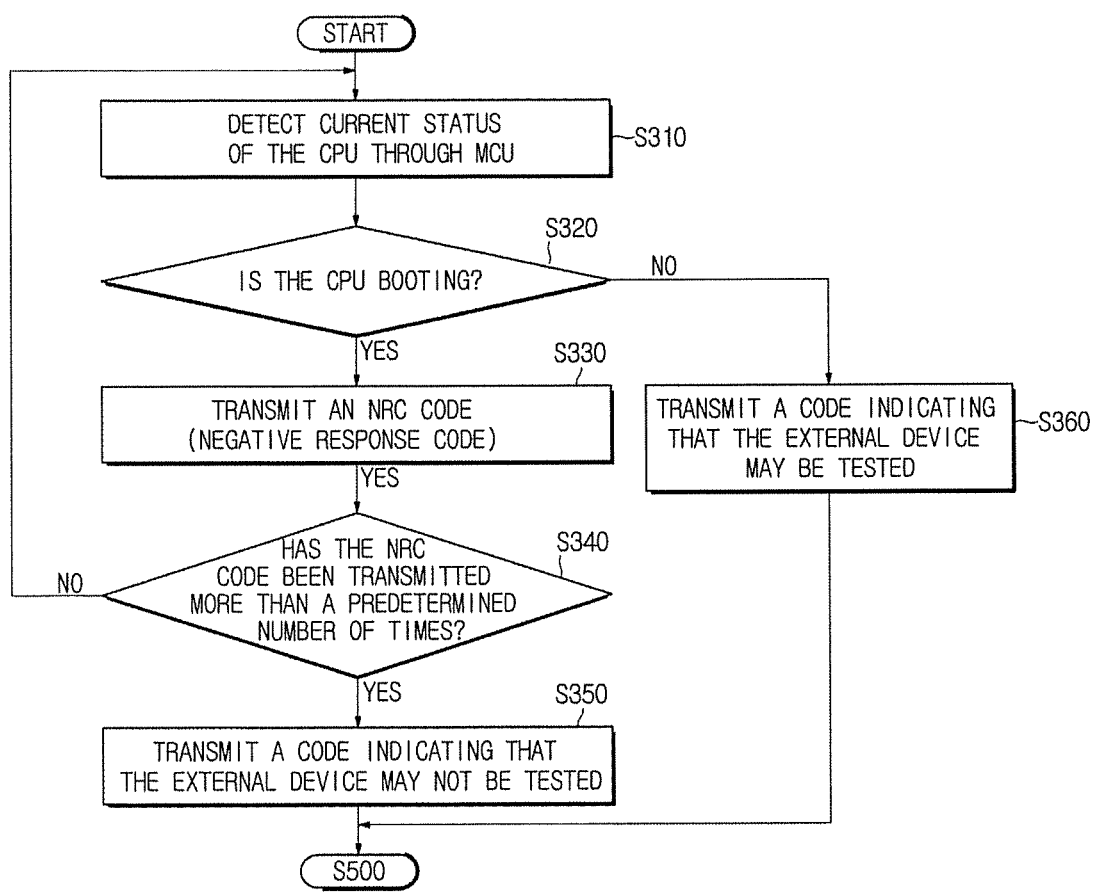
FIG. 6 is a flowchart illustrating a sequence of operation of a vehicle according to another embodiment of the present disclosure.
Figure 7:
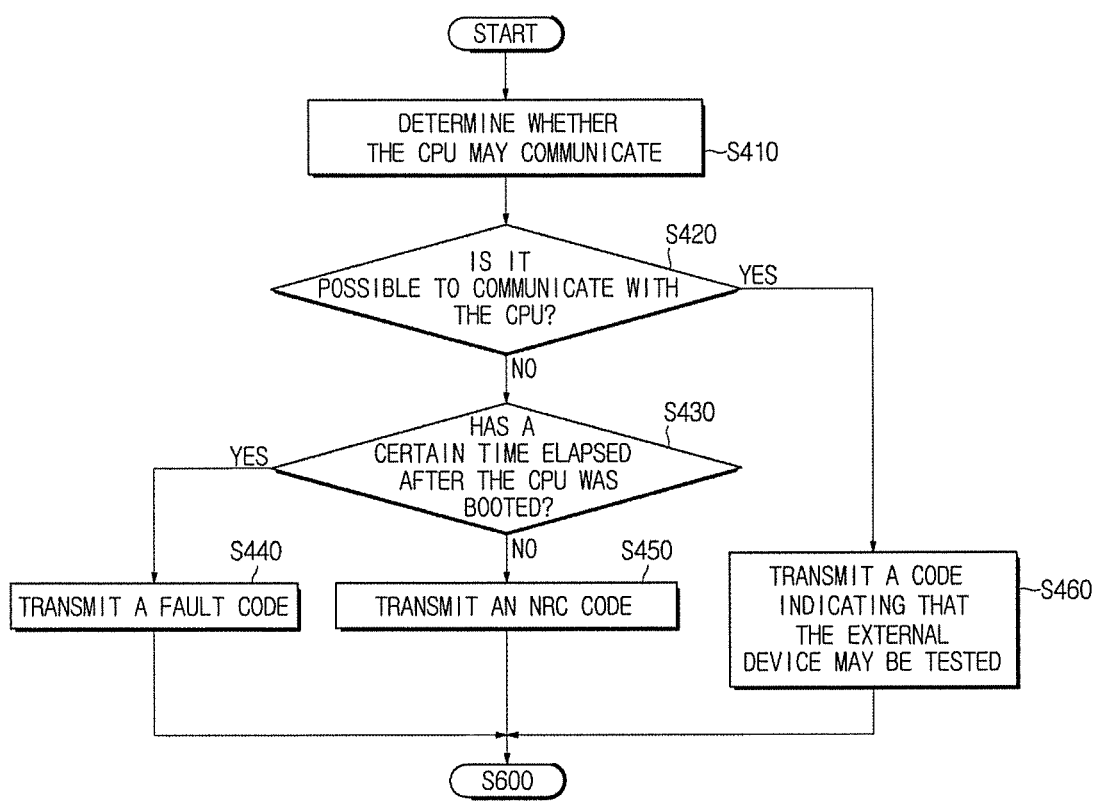
FIG. 7 is a flowchart illustrating a sequence of operation of a vehicle according to another embodiment of the present disclosure.
Figure 8:
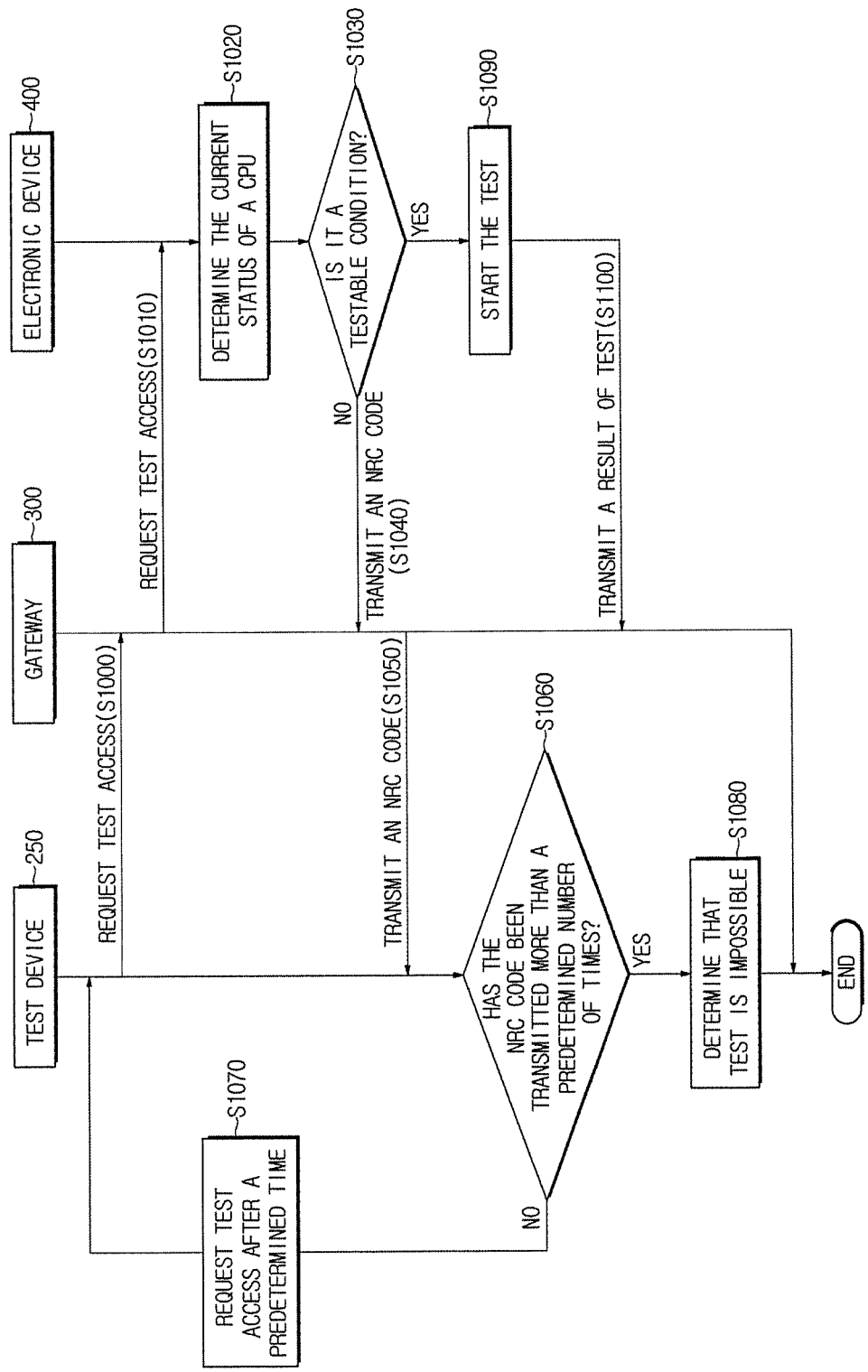
FIG. 8 is a flowchart illustrating a sequence of operation of a vehicle test system according to an embodiment of the present disclosure.

FIG. 5 to FIG. 7 are flowcharts illustrating a sequence of operations of a vehicle, according to an embodiment of the present disclosure.

Although the communication device and the controller have been described with reference to FIG. 4, the communication device may include an MCU, and the controller may include a CPU. Hereinafter, the MCU and the CPU will be described with reference to the drawings.

Referring to FIG. 5, the vehicle 1 determines whether there is another MCU in the electronic device when receiving a test signal for the electronic device from the external device 200 (S100, S200).

When the electronic device includes a separate MCU capable of communicating with the CPU, the vehicle 1 may determine the status of the current CPU using the MCU, and then determine whether the electronic device is testable based on the status of the CPU.

However, if the electronic device does not include a separate MCU, the vehicle 1 may communicate with the CPU to determine the current state of the CPU and determine whether the electronic device is testable based on the determination. (S300, S400, S500)

Step S300 will be described with reference to FIG. 6 and step S400 will be described with reference to FIG. 7.

Referring to FIG. 6, if the electronic device includes a separate MCU, the vehicle 1 senses the current state of the electronic device using the MCU. (S310)

The reason for detecting the state of the CPU by using the MCU is that the MCU has a relatively faster booting speed than the CPU, and the MCU may reach the normal state faster than the CPU after the vehicle 1 is turned on. Therefore, the vehicle 1 may use the MCU to determine the state of the CPU even before the CPU reaches a normal state.

If the CPU is currently booting, the vehicle 1 transmits an NRC (Negative Response Code) to the external device 200 because the external device may not test the current electronic device. (S330)

The NRC refers to a code that currently may not perform a test of an electronic device. The NRC is also a code that means that the CPU may not proceed because the CPU is booting, but it does not mean that the test may not proceed because of the CPU malfunction.

After transmitting the NRC, the vehicle determines whether the number of transmitted NRCs exceeds a predetermined number of times. (S340)

If the number of times the NRC has been transmitted does not exceed the predetermined number, it is in a normal booting process, so the process returns to S310.

However, if the number of times the NRC has been transmitted exceeds the preset number, it may be determined that the CPU is not operating normally.

Therefore, the vehicle 1 transmits a code indicating that the external device 200 may not test the current electronic device. (S350)

The vehicle 1 determines whether a predetermined time has elapsed based on whether or not the NRC has been transmitted a predetermined number of times or more.

The preset number of times is not limited to a specific number but may be variously set according to the electronic device depending on the situation such as 5 times, 10 times, and so on.

If the CPU is not booting, the CPU is in a normal state, so that the vehicle 1 may send a code to the external device 200 indicating that it may test the current electronic device. (S360)

When the external device transmits a signal to the electronic device before the CPU of the electronic device is normalized after the start-up of the vehicle is turned on, the CPU of the electronic device may not receive the signal and the external device may not proceed with the test.

In this case, the external device informs the user that the electronic device is not testable. However, according to the related art, there is a disadvantage in that the user may not be able to distinguish whether the current state of the electronic device is unavailable because the electronic device is still booting, or the CPU of the electronic device is not operating properly.

However, the vehicle 1 may quickly determine the state of the CPU by using an MCU having a fast booting speed. If it is determined that the test is impossible because the CPU is booting, the vehicle transmits the NRC to the external device 200, so that the user may quickly determine the state of the current electronic device.

That is, the user may quickly know that the reason for not testing the electronic device is that the CPU is not testable because the CPU is not operating normally, or that the boot is not yet completed and the test is impossible.

FIG. 7 is a flowchart showing a procedure for determining whether or not an electronic device is testable when the electronic device does not include a separate MCU.

When the electronic devices in the vehicle perform Ethernet communication, the CPU of the electronic device directly performs the communication. Therefore, in this case, unlike the case where the electronic device includes the MCU, the state of the CPU may be determined only after the booting of the CPU is completed, and it is possible to determine whether or not the electronic device is testable.

That is, in this case, it is determined whether or not the electronic device is testable based on the state of the CPU, unlike the case where the electronic device includes the MCU.

Referring to FIG. 7, the vehicle 1 determines whether or not the CPU is able to communicate. (S410)

If the CPU is able to communicate, it may be determined that the state of the CPU is normal. Therefore, the vehicle 1 transmits a code indicating that the electronic device is testable to the external device 200. (S420, S460)

However, if the CPU is not able to communicate, the current electronic device is not testable. Therefore, the vehicle 1 transmits a code indicating that the external device 200 may not test the current electronic device.

However, the reason why the electronic device is not testable is to discriminate whether the current CPU is in the process of being booted or not, or whether the CPU is not operating normally, so that the vehicle 1 determines whether a preset time has elapsed after booting the CPU. (S430)

If a certain period of time has not elapsed since the CPU was booted, the vehicle 1 transmits the NRC to the external device because the CPU is still booting and the test is impossible.

However, if communication may not be established even after a certain period of time has elapsed since the booting of the CPU, the CPU is in a malfunction state, so the vehicle 1 transmits a code indicating that the electronic device is not testable to the external device 200. (S440)

FIG. 8 is a flowchart illustrating a sequence of operations of a vehicle test system, according to an embodiment of the present disclosure.

Referring to FIG. 8, the vehicle test system 100 may include at least one electronic device 400 installed in the vehicle 1, the test device 250 and the gateway 300 configured to communicate with the electronic device 400 and the test device 250.

The test device 250 for testing the electronic device 400 transmits the test access signal to the gateway 300 and the gateway 300 that receives the signal transmits the test access signal to the electronic device 400 to be tested. (S1000, S1010)

After receiving the test access signal, the electronic device 400 determines whether or not the current state of the CPU of the electronic device 400 is available based on the status of the CPU of the electronic device 400. (S1020)

The method of determining the state of the CPU has been described in detail with reference to FIGS. 6 and 7, and will be omitted.

If the CPU is able to test the electronic device 400, the electronic device 400 performs the test and sends the test result to the test device 250. (S1100)

However, if the CPU is not able to test the electronic device 400, the electronic device 400 transmits an NRC indicating that the current test is impossible to the gateway 300. (S1040)

The test device 250 receiving the NRC from the gateway 300 determines whether the NRC has been received more than a predetermined number of times.

If the predetermined number of times has not been exceeded, the gateway 300 transmits a signal requesting test access again after a predetermined time elapses. (S1070)

However, if the NRC is received more than a certain number of times, it is not impossible to test because of the booting of the CPU, but it is impossible to check because of the current CPU inoperability.

Therefore, the test device 250 informs the user of the impossibility of test of the electronic device. (S1080)

Features and effects of embodiments of the present disclosure have been described with reference to accompanying drawings. When the external device transmits a signal to the electronic device before the CPU of the electronic device is normalized after the start-up of the vehicle is turned on, the CPU of the electronic device may not receive the signal and the external device may not proceed with the test.

In this case, the external device informs the user that the electronic device is not testable. However, according to the related art, there is a disadvantage in that the user may not be able to distinguish whether the current state of the electronic device is unavailable because the electronic device is still booting, or the CPU of the electronic device is not operating properly.

However, the vehicle 1 and the vehicle test system 100 may quickly determine the state of the CPU by using an MCU having a fast booting speed. If it is determined that the test is impossible because the CPU is booting, the vehicle transmits the NRC to the external device, so that the user may quickly determine the state of the current electronic device.

Although the present disclosure is described with reference to some embodiments as described above and accompanying drawings, it will be apparent to those of ordinary skill in the art that various modifications and changes may be made to the embodiments. For example, the aforementioned method may be performed in a different order, and/or the aforementioned systems, structures, devices, circuits, etc., may be combined in different combinations from what is described above, and/or replaced or substituted by other components or equivalents thereof, to obtain appropriate results. Therefore, other embodiments and equivalents thereof may fall within the following claims.

What is claimed is:

1. A vehicle test system comprising:
   a vehicle comprising at least one electronic device installed in the vehicle and a gateway configured to determine whether or not the electronic device is testable; and
   a test device configured to test the electronic device,
   wherein the electronic device comprises a controller for controlling an operation of the electronic device; and
   wherein the gateway is configured to determine whether or not the electronic device is testable in a different manner depending on whether the electronic device comprises a separate communication device and transmits a determined result to the test device.

2. The vehicle test system of claim 1,
   wherein the gateway is configured to determine whether or not the electronic device is testable based on a state of the controller received from the communication device when the electronic device comprises the communication device.

3. The vehicle test system of claim 2,
   wherein the gateway is configured to determine that the electronic device is not testable when the controller is not operating normally and transmits a Negative Response Code (NRC) to the test device.

4. The vehicle test system of claim 2,
wherein the communication device comprises a microcontroller unit (MCU) capable of communicating with the gateway and controller; and
wherein the controller comprises a central processing unit (CPU).

5. The vehicle test system of claim 3,
wherein the gateway is configured to determine that the electronic device is not testable and transmits the NRC to the test device if a central processing unit (CPU) is turned off or before booting is completed.

6. The vehicle test system of claim 5,
wherein the gateway is configured to determine whether or not the electronic device is testable based on an elapsed time after the controller of the electronic device is turned on when the electronic device does not comprise the communication device and the gateway is unable to communicate with the controller.

7. The vehicle test system of claim 6,
wherein the gateway is configured to transmit the NRC to the test device when a predetermined time has not elapsed after the controller of the electronic device is turned on.

8. The vehicle test system of claim 7,
wherein the gateway is configured to transmit a code indicating that testing of the electronic device is impossible to the test device when the predetermined time has not elapsed after the controller of the electronic device is turned on.

9. A vehicle comprising:
at least one electronic device installed in the vehicle; and
a gateway configured to communicate with an external device testing the electronic device and determine whether the electronic device is testable,
wherein the electronic device comprises a controller for controlling an operation of the electronic device; and
wherein the gateway configured to determine whether or not the electronic device is testable in a different manner depending on whether the electronic device comprises a separate communication device and transmits a determined result to the test device.

10. The vehicle of claim 9,
wherein the gateway is configured to determine whether or not the electronic device is testable based on a state of the controller received from the communication device when the electronic device comprises the communication device.

11. The vehicle of claim 10,
wherein the gateway is configured to determine that the electronic device is not testable when the controller is not operating normally and transmits a Negative Response Code (NRC) to the test device.

12. The vehicle of claim 10,
wherein the communication device comprises a microcontroller unit (MCU) capable of communicating with the gateway and controller; and
wherein the controller comprises a central processing unit (CPU).

13. The vehicle of claim 12,
wherein the gateway is configured to determine that the electronic device is not testable and transmits a Negative Response Code (NRC) to the test device when the CPU is turned off or before booting is completed.

14. The vehicle of claim 9,
wherein the gateway is configured to determine whether or not the electronic device is testable based on an elapsed time after the controller of the electronic device is turned on when the electronic device does not comprise the communication device and the gateway is unable to communicate with the controller.

15. The vehicle of claim 14,
wherein the gateway is configured to transmit a Negative Response Code (NRC) to the test device when a predetermined time has not elapsed after the controller of the electronic device is turned on.

16. The vehicle of claim 14,
wherein the gateway is configured to transmit a code indicating that testing of the electronic device is impossible to the test device when a predetermined time has not elapsed after the controller of the electronic device is turned on.

17. A method for controlling a vehicle comprising at least one electronic device installed in the vehicle, the method comprising steps of:
determining whether the electronic device is testable; and
transmitting a determined result to an external device for testing the electronic device,
wherein the step of determining whether the electronic device is testable comprises determining whether the electronic device is testable in a different manner according to whether the electronic device comprises a microcontroller unit (MCU) capable of determining a state of a central processing unit (CPU) of the electronic device.

18. The method of claim 17,
wherein the step of determining whether the electronic device is testable comprises determining whether or not the electronic device is testable based on the state of the CPU received from the MCU when the electronic device comprises the CPU.

19. The method of claim 18,
wherein the step of determining whether the electronic device is testable comprises determining that the electronic device is not testable and transmitting a Negative Response Code (NRC) to the external device when the CPU is turned off or before booting is completed.

20. The method of claim 17,
wherein the step of determining whether the electronic device is testable comprises determining whether or not the electronic device is testable based on an elapsed time after the CPU of the electronic device is turned on when the electronic device does not comprise the MCU.

21. The method of claim 20,
wherein the step of determining whether the electronic device is testable comprises transmitting the NRC to the external device when a predetermined time has not elapsed after the CPU of the electronic device is turned on.

22. The method of claim 20,
wherein the step of determining whether the electronic device is testable comprises transmitting a code indicating that testing of the electronic device is impossible to the external device when a predetermined time has not elapsed after the CPU of the electronic device is turned on.

* * * * *